US012511753B2

(12) United States Patent
Yao et al.

(10) Patent No.: US 12,511,753 B2
(45) Date of Patent: Dec. 30, 2025

(54) IMAGE PROCESSING METHOD, APPARATUS AND NON-TRANSITORY COMPUTER READABLE MEDIUM FOR PERFORMING IMAGE PROCESSING

(71) Applicant: Alibaba (China) Co., Ltd., Hangzhou (CN)

(72) Inventors: Jiawen Yao, Beijing (CN); Yingda Xia, North Bethesda, MD (US); Ke Yan, Beijing (CN); Dakai Jin, Laurel, MD (US); Xiansheng Hua, Zhejiang (CN); Le Lu, Bethesda, MD (US); Ling Zhang, Rockville, MD (US)

(73) Assignee: Alibaba (China) Co., Ltd., Hangzhou (CN)

( * ) Notice: Subject to any disclaimer, the term of this patent is extended or adjusted under 35 U.S.C. 154(b) by 513 days.

(21) Appl. No.: 18/046,385

(22) Filed: Oct. 13, 2022

(65) Prior Publication Data
US 2024/0005507 A1    Jan. 4, 2024

(30) Foreign Application Priority Data
May 24, 2022   (CN) .......................... 202210570707.0

(51) Int. Cl.
*G06T 7/10* (2017.01)
*G06T 7/73* (2017.01)
*G06V 20/70* (2022.01)

(52) U.S. Cl.
CPC .................. *G06T 7/10* (2017.01); *G06T 7/73* (2017.01); *G06V 20/70* (2022.01);
(Continued)

(58) Field of Classification Search
CPC ... G06T 7/10; G06T 7/13; G06T 2207/10081; G06T 2207/20084; G06V 20/70; G06V 2201/031
See application file for complete search history.

(56) References Cited

U.S. PATENT DOCUMENTS

| 11,881,038 B2 * | 1/2024 | Peng ........................ G06N 3/08 |
| 2019/0030371 A1 * | 1/2019 | Han ..................... A61N 5/1039 |

(Continued)

FOREIGN PATENT DOCUMENTS

| CN | 109903292 A | 6/2019 |
| CN | 112001931 A | 11/2020 |

(Continued)

OTHER PUBLICATIONS

Sinha, Ashish, and Jose Dolz. "Multi-scale self-guided attention for medical image segmentation." IEEE journal of biomedical and health informatics 25.1 (2020): 121-130.*

(Continued)

*Primary Examiner* — Shefali D Goradia
(74) *Attorney, Agent, or Firm* — Finnegan, Henderson, Farabow, Garrett & Dunner, LLP

(57) ABSTRACT

An image processing method is provided. The method includes obtaining a to-be-processed image comprising a target object, and inputting the to-be-processed image to a convolutional layer of an image processing model, to obtain an initial feature map of the to-be-processed image, wherein the image processing model comprises an encoder and a decoder; inputting the initial feature map to a self-attention mechanism layer of the encoder, and obtaining a target feature map corresponding to the initial feature map according to position information of each feature in the initial feature map and a position relationship between the each feature and other features; and inputting the target feature map to the decoder for processing, to obtain an object segmentation map and an object label of the target object in the to-be-processed image.

17 Claims, 8 Drawing Sheets

(52) U.S. Cl.
CPC ............... *G06T 2207/10081* (2013.01); *G06T 2207/20084* (2013.01); *G06V 2201/031* (2022.01)

(56) References Cited

U.S. PATENT DOCUMENTS

2022/0253639 A1* 8/2022 Fan .................. G06N 3/045
2023/0281806 A1* 9/2023 Zhang ................ G06V 10/82
382/128

FOREIGN PATENT DOCUMENTS

| CN | 112734715 | A | | 4/2021 | |
|----|-----------|---|---|--------|---|
| CN | 113205538 | A | | 8/2021 | |
| CN | 113569867 | A | | 10/2021 | |
| CN | 114092465 | A | | 2/2022 | |
| CN | 114170231 | A | | 3/2022 | |
| CN | 114283152 | A | * | 4/2022 | |
| WO | 2021179205 | A1 | | 9/2021 | |
| WO | WO-2023225235 | A1 | * | 11/2023 | ........... G06N 3/0442 |

OTHER PUBLICATIONS

Wu, Cong-Zhong, et al. "Encoding-decoding network with pyramid self-attention module for retinal vessel segmentation." International Journal of Automation and Computing 18.6 (2021): 973-980.*
First Office Action issued in corresponding Chinese Application No. 202210570707.0 on Oct. 30, 2024, (12 pages).

* cited by examiner

IMAGE PROCESSING METHOD, APPARATUS AND NON-TRANSITORY COMPUTER READABLE MEDIUM FOR PERFORMING IMAGE PROCESSING

CROSS-REFERENCE TO RELATED APPLICATIONS

The disclosure claims the benefits of priority to Chinese Application No. 202210570707.0, filed May 24, 2022, which is incorporated herein by reference in its entirety.

TECHNICAL FIELD

The present disclosure generally relates to computer technologies, and more particularly, to an image processing method, an apparatus and a non-transitory computer readable medium for performing image processing.

BACKGROUND

Esophageal cancer is a cancer with a relatively high fatality rate. Early detection of resectable/curable esophageal cancer has great potential to reduce mortality rate. Although some esophageal cancer screening methods have been developed, these screening methods are invasive, require anesthesia, or are expensive, which may be difficult to apply to the general population, and often fail to achieve satisfactory sensitivity in identifying early-stage cancers.

SUMMARY OF THE DISCLOSURE

Embodiments of the present disclosure provide an image processing method. The method includes obtaining a to-be-processed image comprising a target object, and inputting the to-be-processed image to a convolutional layer of an image processing model, to obtain an initial feature map of the to-be-processed image, wherein the image processing model comprises an encoder and a decoder; inputting the initial feature map to a self-attention mechanism layer of the encoder, and obtaining a target feature map corresponding to the initial feature map according to position information of each feature in the initial feature map and a position relationship between the each feature and other features; and inputting the target feature map to the decoder for processing, to obtain an object segmentation map and an object label of the target object in the to-be-processed image.

Embodiments of the present disclosure provide an apparatus for performing image processing. The apparatus includes a memory configured to store instructions; and one or more processors configured to execute the instructions to cause the apparatus to perform: obtaining a to-be-processed image comprising a target object, and inputting the to-be-processed image to a convolutional layer of an image processing model, to obtain an initial feature map of the to-be-processed image, wherein the image processing model comprises an encoder and a decoder; inputting the initial feature map to a self-attention mechanism layer of the encoder, and obtaining a target feature map corresponding to the initial feature map according to position information of each feature in the initial feature map and a position relationship between the each feature and other features; and inputting the target feature map to the decoder for processing, to obtain an object segmentation map and an object label of the target object in the to-be-processed image.

Embodiments of the present disclosure provide a non-transitory computer readable medium that stores a set of instructions that is executable by one or more processors of an apparatus to cause the apparatus to perform: obtaining a to-be-processed image comprising a target object, and inputting the to-be-processed image to a convolutional layer of an image processing model, to obtain an initial feature map of the to-be-processed image, wherein the image processing model comprises an encoder and a decoder; inputting the initial feature map to a self-attention mechanism layer of the encoder, and obtaining a target feature map corresponding to the initial feature map according to position information of each feature in the initial feature map and a position relationship between the each feature and other features; and inputting the target feature map to the decoder for processing, to obtain an object segmentation map and an object label of the target object in the to-be-processed image.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
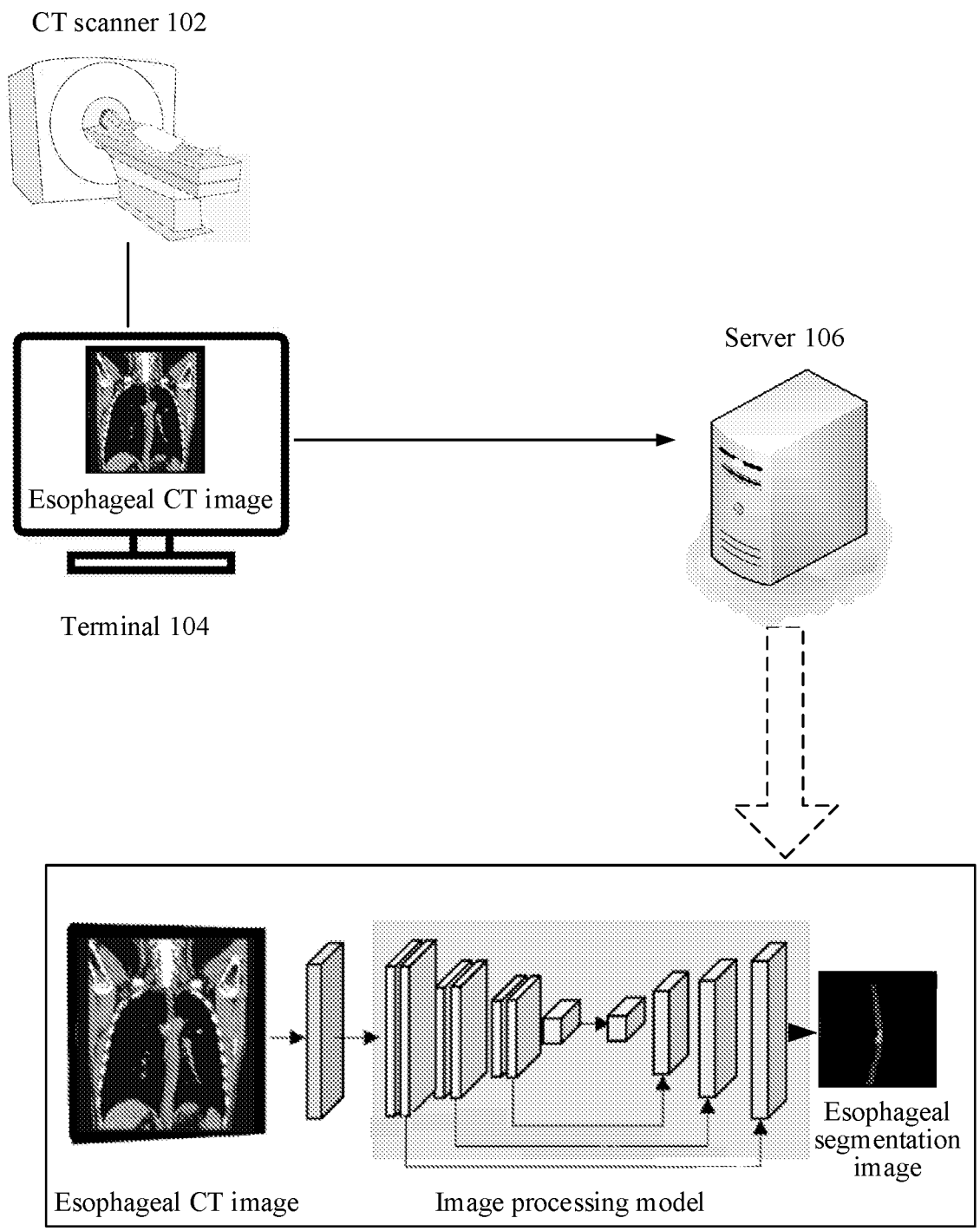
FIG. 1 is a schematic diagram of a specific scenario in which an image processing method is applied to esophageal cancer screening, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

Esophageal cancer is a cancer with a relatively high fatality rate. According to incomplete statistics, a 5-year survival rate of people having the cancer is relatively low. However, if a resectable/curable esophageal cancer is detected at an early stage, a mortality rate thereof is reduced to a large extent.

Currently, there have already been some tools for screening of the esophageal cancer. For example, in some high-risk regions, endoscopy, cytology, and blood-based biomarkers are used for esophageal cancer screening. In some regions, a mortality rate caused by esophageal squamous-cell carcinoma (ESCC) has been reduced by using the endoscopy. However, the endoscopy requires a high degree of expertise, which may result in a relatively high missing detection rate. In addition, it is difficult to apply to general population because of its invasiveness and high cost. The cytology may be a minimally invasive alternative to endoscopy, but sensitivity and specificity thereof are still lower than that of the endoscopy. Blood test provides a wide range of non-invasive tests, but its sensitivity to detection of an esophageal cancer at an early stage is only moderate. Research has shown that the blood test needs to be combined with other screening techniques (e.g., imaging) to optimize a result. In this case, there is an urgent need for a new method for screening the esophageal cancer which is non-invasive, costs lowly, is easy to use, and has high precision.

Conventional CT imaging for other clinical indications provides an opportunity for disease screening, and there is no need for additional cost, additional examination, or radiation exposure of the patient. Previous studies have shown that abdominal and chest CT provides value for osteoporosis screening and cardiovascular disease prediction. In terms of cancer detection, researchers found that a pancreatic cancer can be detected by deep learning through plain CT with a high degree of accuracy, which has long been considered impossible (because pancreatic cancer can only be detected through contrast-enhanced CT in the past). The ability to detect cancer based on the plain CT, coupled with established clinical indications (such as a lung cancer screening through the chest CT), can be considered to be used for screening a population-based asymptomatic adult cancer.

However, it may be challenging to detect the esophageal cancer based on the plain CT. (1) The pancreatic cancer is mainly adenocarcinoma. Unlike other solid organs, the esophageal cancer is mainly squamous cell carcinoma located in a long hollow organ. Therefore, it is difficult to obtain high specificity, which is a necessary condition for an ideal screening tool. (2) Importantly, an early-stage esophageal cancer tumor may be very small. An early-stage tumor detection task is extremely challenging due to poor contrast between a tumor and a normal esophageal tissue in the plain CT, such as the chest CT. Actually, even in the contrast-enhanced CT, human specialists often require considerable effort and expertise to detect an early-stage esophageal tumor, with reference to other clinical information such as endoscopy, endoscopic ultrasound, and FDG-PET (fluorodeoxyglucose positron emission tomography). Even so, some tiny tumors are still difficult to detect through CT.

Up till now, esophageal cancer image analysis studies based on the deep learning are all focused on a tumor segmentation task, to improve segmentation accuracy by improving local image feature extraction/modeling or fusion multi-modal imaging.

Based on this, the embodiments of the present disclosure provide a tool based on deep learning, through which the plain CT is used for screening the esophageal cancer.

Specifically, if there is an esophageal tumor, the esophageal tumor can be classified as cancerous or benign. As described above, in the plain CT, texture of a local image may not be enough to detect the esophageal tumor. In clinical practice, holistic features of the esophagus, such as "asymmetric esophageal wall thickening" and "esophageal wall squeezing," are key signs for screening the esophageal cancer, especially early symptoms. On the other hand, for the deep learning, each convolution kernel can only participate in a voxel or a local subset of a local pattern, rather than a global context.

Therefore, in the embodiments of the present disclosure, a global attention layer is combined with position embedding, to enhance a long-term dependency capability in three-dimensional medical image segmentation. Such kind of design can improve a capability to identify the tumor, especially an early-stage tumor. In specific training, a sample data set of 741 patients was collected, and included two major types of the esophageal tumor (ESCC and leiomyoma), which are used for performing image processing model training with a normal esophagus. On validation of a test set, an AUC (Area Under Curve) of the image processing model is 0.990, sensitivity thereof is 93.0%, and specificity thereof is 97.5%, surpassing average sensitivity of 75.0% and specificity of 83.8% of four doctors.

Specifically, an image processing method is provided. Some embodiments of the present disclosure relate to an image processing apparatus, two esophageal CT image processing methods, two esophageal CT image processing apparatuses, a computing device, a computer-readable storage medium, and a computer program, which are described in detail below.

Specifically, the image processing method provides a novel position-sensitive self-attention mechanism. When the object segmentation map of the target object in the to-be-processed image is predicted, prediction accuracy of a model is enhanced through such non-local interaction according to a position relationship between each feature in the initial feature map of the to-be-processed image and other features of a global image. When the mechanism is applied to a scenario of esophageal cancer screening, an early-stage cancer can be identified accurately by such non-invasive method, and sensitivity is also relatively high.

FIG. 1 is a schematic diagram of a specific scenario in which an image processing method is applied to esophageal cancer screening, according to some embodiments of the present disclosure.

FIG. 1 shows a CT scanner 102, a terminal 104, and a server 106.

In a specific implementation, the CT scanner 102 performs CT scan on a user who is to be screened for the esophageal cancer and obtains an esophageal CT image of the user. The terminal 104 obtains the esophageal CT image from the CT scanner 102 and sends the esophageal CT image to the server 106. The server 106 inputs the esophageal CT image to a pre-trained image processing model, outputs an esophageal segmentation image corresponding to the esophageal CT image and returns the esophageal segmentation image to the terminal 104. An operating user (for example, a doctor) of the terminal 104 may determine an esophageal condition of the user according to the esophageal segmentation image, thereby determining whether an esophagus of the user is normal, benign, or cancerous. The image processing model may be understood as a deep learning model pre-trained by combining a global self-attention mechanism and a historical esophageal CT image.

In addition, the image processing model can not only output the esophageal segmentation image, but also output an object label of the esophageal CT image according to a label of each segmentation portion in the esophageal segmentation image, such as benign, normal, and cancerous labels.

The image processing method provided in the embodiments of the present disclosure is applied to a specific scenario of esophageal cancer screening, in which a novel position-sensitive self-attention is proposed. A global context feature is captured, to enhance the nnUNet (no-new-UNet) through such non-local interaction and improve segmentation accuracy of the image processing model.

Specifically, a global context feature of the esophagus is a key feature of cancer detection, especially for an early-stage cancer. In order to capture such a global context, the embodiments of the present disclosure propose a novel position-sensitive self-attention, to enhance the nnUNet through non-local interaction. In an experiment, the image processing model achieved 93.0% sensitivity and 97.5% specificity in a detection of esophageal tumors in a test of 180 patients. In comparison, average sensitivity and specificity of the four doctors were respectively 75.0% and 83.8%. For a classification task, in terms of accuracy of cancerous, benign tumor, and normal, the image processing model was respectively 17%, 31%, and 14% higher than the doctors in average. Compared with the existing invasive esophageal cancer screening method, the image processing method provided in the embodiments of the present disclosure has superior performance, and are more sensitive to the early-stage cancer and a benign tumor. That is, the image processing method provided in the embodiments of the present disclosure is a novel, non-invasive, low-cost, and high-precision esophageal cancer opportunity screening method.

Figure 2:
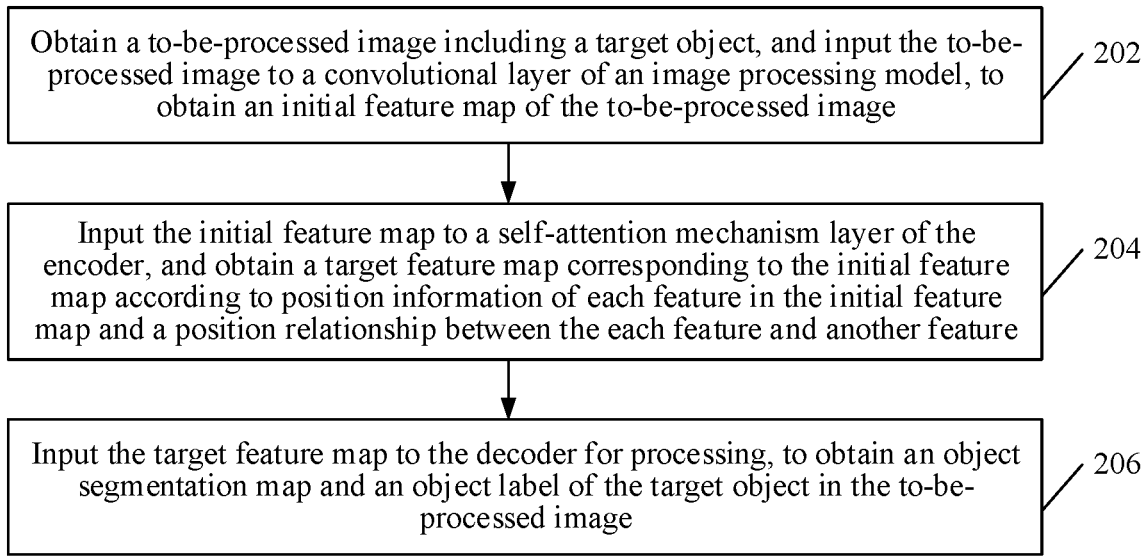
FIG. 2 is a flowchart of an image processing method, according to some embodiments of the present disclosure.

FIG. 2 is a flowchart of an image processing method, according to some embodiments of the present disclosure, and specifically includes the following steps 202 to 206.

At step 202, a to-be-processed image including a target object is obtained, and the to-be-processed image is inputted to a convolutional layer of an image processing model, to obtain an initial feature map of the to-be-processed image.

The image processing model includes an encoder and a decoder.

Specifically, the image processing method provided in the embodiments of the present disclosure can be applied in an esophageal cancer screening scenario, and can also be applied in other applicable scenarios, for example, a scenario similar to the esophageal cancer screening scenario.

If a specific application scenario of the image processing method is different, the to-be-processed image including the target object is also different. For example, if the image processing method is applied to the esophageal cancer screening scenario, the to-be-processed image including the target object may be understood as a CT image including an esophagus. That is, the to-be-processed image including the target object is the CT image including the esophagus.

For ease of understanding, in the following embodiments, an example in which the to-be-processed image is the CT image including the esophagus is used for detailed description.

Using an example in which the to-be-processed image including the target object is the CT image including the esophagus, the to-be-processed image including the target object is obtained, and the to-be-processed image is inputted to a convolutional layer of an image processing model, to obtain an initial feature map of the to-be-processed image. It can be understood as a case that the CT image including the esophagus is obtained, and the CT image is inputted to a convolutional layer of a pre-trained image processing model, to obtain an initial feature map of the CT image.

In practical application, the image processing model includes an encoder and a decoder, and the convolutional layer is located in the encoder. Therefore, the to-be-processed image is inputted to the convolutional layer of the image processing model, to obtain the initial feature map of the to-be-processed image. It can be understood as a case that the CT image is inputted to the convolutional layer of the encoder, to obtain the initial feature map of the CT image.

In addition, because there are many features in the initial feature map of the to-be-processed image after a convolution, if the initial feature map with many features is inputted to a self-attention mechanism layer for performing self-attention computation, a computation burden is relatively high. If the to-be-processed image is convolved for a plurality of times, features in an initial feature map obtained after convolution is relatively small, resulting in inaccurate computation. Therefore, in order to avoid the foregoing problem, the to-be-processed image may be convolved twice through the convolutional layer in the encoder, and then subsequent computation of the self-attention mechanism layer is performed according to the initial feature map after the convolution. That is, the to-be-processed image is inputted to two convolutional layers of the encoder of the image processing model, to obtain the initial feature map of the to-be-processed image.

Certainly, the number of convolutional layers through which the feature extraction performs, may be set according to actual application. This is not limited in the embodiments of the present disclosure.

Before the image processing model is used for predicting an object segmentation map and an object label of the target object in the to-be-processed image, the image processing model needs to be pre-trained, to ensure accuracy and stability of use of a subsequent image processing model.

Specifically, a training step of the image processing model is as follows.

A sample image including a sample object is obtained, and a sample object segmentation map and a sample object label of the sample object in the sample image are determined.

The sample image is inputted to a convolutional layer of the encoder, to obtain an initial sample feature map of the sample image.

The initial sample feature map is inputted to the self-attention mechanism layer of the encoder, and a target sample feature map corresponding to the initial sample feature map is obtained according to position information of each initial sample feature in the initial sample feature map and a position relationship between the each initial sample feature and other initial sample features.

The target sample feature map is inputted to the decoder for processing, to obtain a predicted object segmentation map and a predicted object label of the sample object in the sample image.

The image processing model is trained according to a loss function composed of the sample object segmentation map and the sample object label, and the predicted object segmentation map and the predicted object label.

If an application scenario of the image processing model is different, the sample image including the sample object is also different.

Still using the above example, the image processing model is applied to the esophageal cancer screening scenario. The sample image of the sample object can be understood as the CT image including the esophagus, which are determined from a historical three-dimensional plain CT image of a patient. Theses historical three-dimensional plain CT images include three-dimensional plain CT image(s) of an esophagus of a normal patient, and three-dimensional plain CT image(s) of an esophagus of a benign or cancerous patient. These CT images are used as sample images to train the image processing model.

In a case that the sample image is a CT image of the esophagus, a sample segmentation map of each sample image can be understood as a segmentation map of a CT image of each esophagus, and each segmentation portion in the segmentation map is marked with an annotation (such as normal, benign, and the like). The sample object label may be understood as a pathological label of the CT image of each esophagus, such as normal, benign, or cancerous.

In practical application, the segmentation map of the CT image of each esophagus is marked by a doctor according to actual experience. In a case that the CT image of the esophagus cannot be accurately marked, an annotation can be marked in a contrast enhanced image of the CT image of the esophagus. Then, based on a marking result in the contrast enhanced image of the CT image of the esophagus, the segmentation map of the CT image of the esophagus is determined. Specific implementations are described as follows.

The determining a sample object segmentation map and a sample object label of the sample object in the sample image includes: determining at least two contrast enhanced sample images including the sample object; and determining the sample object segmentation map and the sample object label of the sample object in the sample image according to a sample annotation of the sample object in the at least two contrast enhanced sample images.

Still using an example in which the sample image is the CT image of the esophagus, the contrast enhanced sample image of the sample image can be understood as an image generated after focused examination is performed on a suspicious portion after contrast agent is injected into vein on the basis of the plain CT of the esophagus.

In a specific implementation, a plurality of contrast enhanced CT images of CT images including the esophagus are obtained. According to a sample annotation for esophagus in each contrast enhanced CT image, a robust image configuration method is used for registering the sample annotation for esophagus in the plurality of contrast enhanced CT images from the contrast enhanced CT to the plain CT, that is, converting the contrast enhanced CT images into the sample segmentation map of the sample object in the sample image.

After the sample segmentation map of the sample object in each sample image is determined, the sample object label may be determined according to each segmentation portion in the sample segmentation map. For example, in a case that a volume of a normal segmentation portion is greater than a preset volume threshold, the sample object label may be considered as normal.

Then, after the sample image, the sample object segmentation map of the sample image, and the sample object label are obtained, the image processing model is specifically trained according to the sample image, the sample object segmentation map of the sample image, and the sample object label.

First, the sample image is inputted to the convolutional layer of the encoder, to obtain the initial sample feature map of the sample image. A specific implementation of obtaining the initial sample feature map is the same as an implementation of obtaining the initial feature map of the to-be-processed image in the foregoing embodiments. For example, the initial sample feature map of the sample image may also be obtained by convolving through the two convolutional layers of the encoder. After the initial sample feature map of the sample image is obtained, the initial sample feature map is inputted to the self-attention mechanism layer of the encoder. A target sample feature map corresponding to the initial sample feature map is obtained according to position information of each initial sample feature in the initial sample feature map, and a position relationship between each initial sample feature and other initial sample features. The self-attention mechanism layer is a global self-attention mechanism layer, and other initial sample features may be understood as other features in the initial sample feature map other than the current sample feature.

In practical application, a receptive field of a segmentation network of a common uNet is limited, and relies heavily on a local text pattern, rather than a global context. If a segmentation model cannot properly segment a target, a future classification task is definitely affected. Therefore, it is much more important to build a more stable image processing model which is more sensitive for tumors, especially early-stage tumors. Therefore, in the image processing model of the image processing method provided in the embodiments of the present disclosure, an architectural improvement by integrating a global self-attention layer is provided, that is, a self-attention mechanism layer is added after each convolutional layer of the encoder, to enhance a global context modeling capability of the model.

Specifically, the initial sample feature map is inputted to the self-attention mechanism layer. When the target sample feature map corresponding to the initial sample feature map is determined through the self-attention mechanism layer, a position of each initial sample feature is determined at the self-attention mechanism layer according to a coordinate grid of the initial sample feature map. Then the target sample feature corresponding to each initial sample feature is calculated, by using a first preset algorithm, according to the position of each initial sample feature, and a relationship between the position of each initial sample feature and a position of other initial sample features. Finally, according to the target sample feature, an accurate target sample feature map corresponding to the initial sample feature map can be obtained. That is, according to a position relationship between features, each initial sample feature has learnt a target sample feature map composed of target sample features of global context knowledge. Specific implementations are as described as follows.

The obtaining a target sample feature map corresponding to the initial sample feature map according to position information of each initial sample feature in the initial sample feature map and a position relationship between the each initial sample feature and other initial sample features includes: determining a coordinate grid of the initial sample feature map, and determining position information of each initial sample feature in the initial sample feature map according to the coordinate grid; calculating, by using a first preset algorithm, a target sample feature corresponding to the each initial sample feature according to the position information of the each initial sample feature and the position relationship between the each initial sample feature and the other initial sample features; and obtaining the target sample feature map corresponding to the initial sample feature map according to the target sample feature.

The to-be-processed image including the target object is a three-dimensional image, and the initial sample feature map is obtained after the three-dimensional image is convolved by the convolutional layer. Therefore, the coordinate grid of the initial sample feature map can be determined through a three-dimensional initial sample feature map, thereby determining a position of each feature (i.e., feature point) in the initial sample feature map in the coordinate grid.

Following the above example, the sample image is the three-dimensional plain CT image of the esophagus. Therefore, the initial sample feature map is obtained by convolving the sample image, and the coordinate grid of the initial sample feature map can be determined according to a coordinate system. The position information of each initial sample feature in the initial sample feature map is determined according to the coordinate grid. A target sample feature corresponding to the each initial sample feature is calculated by using a first preset algorithm according to the position information of the each initial sample feature and the position relationship between the each initial sample feature and other sample features. Finally, the target sample feature map is constructed according to the target sample feature. That is, after the initial sample feature map of each sample image is obtained through the convolutional layer, the target sample feature corresponding to each initial sample feature in the initial sample feature map is calculated by using the first preset algorithm. Subsequently, the target sample feature map can be determined according to the target sample feature. Specifically, the first preset algorithm can be implemented according to the following Equation 1:

$$y_o = \Sigma_{p \in N} \text{softmax}_p(q_o^T k_p) v_p \qquad (1)$$

where $y_o$ represents the target sample feature corresponding to each initial sample feature, N represents the coordinate grid of the initial sample feature map, p represents another sample feature corresponding to o, o represents each current initial sample feature involved in calculation in the initial sample feature map, $q_o = W_Q x_o$ represents a query variable at an o position, $k = W_K x_o$ represents a key variable at the o position, $v_o = W_V x_o$ represents a value variable at the o position, and $q_o = W_Q x_o$, $k = W_K x_o$, and $v_o = W_V x_o$ are all projections of an input $x_o$, and $W_Q$, $W_K$, $W_V$ are all learnable matrices.

Using an example in which the initial sample feature map is $x \in R^{C_{in} \times H \times W \times D}$, each initial sample feature in the initial feature map is calculated through Equation 1, and a target sample feature map formed by an obtained corresponding target sample feature is $y_o \in R^{C_{out} \times H \times W \times D}$. That is, an input of the self-attention mechanism layer is x, and an output after the self-attention mechanism layer is y. Through calculation of Equation 1, each initial sample feature can learn knowledge of other sample features, and a position relationship with other sample features. In subsequent application, a feature of a context can also be considered as correct segmentation prediction.

In practical application, when a self-attention mechanism is applied to a visual problem (such as image processing), computational complexity of the self-attention mechanism is high. In order to reduce the computational complexity, a point o (initial sample feature) at each position in the initial sample feature map can be processed through local region computation. Specific implementations are as follows.

The obtaining a target sample feature map corresponding to the initial sample feature map according to position information of each initial sample feature in the initial sample feature map and a position relationship between the each initial sample feature and other initial sample features includes: determining a coordinate grid of the initial sample feature map, and determining position information of each initial sample feature in the initial sample feature map according to the coordinate grid; determining an associated region of the each initial sample feature and an associated sample feature of the associated region according to the position information; calculating, by using a second preset algorithm, a target sample feature corresponding to the each initial sample feature according to the position information of the each initial sample feature and a position relationship between the each initial sample feature and the associated sample feature; and obtaining the target sample feature map corresponding to the initial sample feature map according to the target sample feature.

The coordinate grid of the initial sample feature map, and determination of the position information of each initial sample feature can be referred to descriptions of the above embodiments, which will not be repeated herein.

Specifically, after the position information of each initial sample feature in the initial sample feature map is determined, the associated region of each initial sample feature and the associated sample feature of the associated region can be determined according to the position information of each initial sample feature, while the associated region is determined according to position information between each initial sample feature and other sample features. For example, according to an actual application situation, a preset distance is extended outwardly with each initial sample feature as a center point, and a region between the preset distance and the initial sample feature is used as the associated region. By using the second preset algorithm, the target sample feature corresponding to the each initial sample feature is calculated according to the position information of the each initial sample feature and a position relationship between the each initial sample feature and the associated sample feature. Finally, the target sample feature map is constructed according to the target sample feature. The second preset algorithm can be implemented according to the following Equation 2:

$$y_o = \Sigma_{p \in M} \text{softmax}_p(q_o^T k_p + q_o^T r_{p-o}^q + k_p^T r_{p-o}^k)(v_p + r_{p-o}^v) \qquad (2)$$

wherein m represents a local region of each o, and r is a learnable parameter code including the position information. p-o represents a distance from a position p to a position o, and $r^k$ and $r^v$ respectively represent encoding for a key variable k and a value variable v. Representation of other parameters may be referred to Equation 1.

It can be known from Equation 2 that, for each position o in the coordinate grid of the initial sample feature map, a local region $M = N_{m_h \times m_w \times m_d}(o)$ is extracted in each self-attention mechanism layer, and a computational amount can be significantly reduced by calculating each initial sample feature and other sample features in a local region m. In addition, a learned relative position encoding item is introduced, and an additional position is embedded in query, key, and value, to capture random interaction with precise position information.

In order to improve performance of the image processing model, a final result is obtained by processing the initial sample feature map through multi-head self-attention mechanism, and a final output is obtained by combining results of each head. Finally, a sample is reshaped to an original size of a feature map.

In the embodiments of the present disclosure, in order to improve computational performance of the self-attention mechanism and reduce the computational complexity of the self-attention mechanism, an associated sample feature of each initial sample feature and a local region with a relatively short distance in the initial sample feature map is determined according to the position information. The target sample feature corresponding to each initial sample feature is calculated with reference to a multi-head attention mechanism according to the position relationship between each initial sample feature and the associated sample feature.

Specifically, obtaining of an associated sample feature of each initial sample feature is determined by using the following methods.

The determining an associated region of the each initial sample feature and an associated sample feature of the associated region according to the position information includes: determining an associated distance between the each initial sample feature and the other initial sample features according to the position information of the each initial sample feature; and determining the associated region of the each initial sample feature according to the associated distance, and determining each initial sample feature in the associated region as the associated sample feature.

A preset distance threshold may be set according to actual application, and this is not limited in the present disclosure.

In a specific implementation, the associated distance between each initial sample feature and the other initial sample features is determined according to the position information of each initial sample feature. Then the associated region of each initial sample feature is determined according to a relationship between the associated distance and a preset associated distance. Each initial sample feature in each associated region is determined as the associated sample feature.

After the associated sample feature of each initial sample feature in the associated region is determined, an associated distance between each initial sample feature and a corresponding associated sample feature is determined. Then the target sample feature corresponding to each initial sample feature is accurately calculated by using the second preset algorithm according to the position information of each initial sample feature, and the associated distance between each initial sample feature and the corresponding associated sample feature, to increase predictive accuracy of a trained image processing model. Specific implementations are as follows.

The calculating, by using a second preset algorithm, a target sample feature corresponding to the each initial sample feature according to the position information of the each initial sample feature and a position relationship between the each initial sample feature and the associated sample feature includes: calculating, by using the second preset algorithm, the target sample feature corresponding to the each initial sample feature according to the position information of the each initial sample feature and an associated distance between the each initial sample feature and the associated sample feature.

In addition, because the initial sample feature map may be three-dimensional with a number of channels, and the number of channels is generally large, in order to further reduce the computational amount of the self-attention mechanism layer, the dimension of the initial sample feature map can be reduced, to improve its computational efficiency. Specific implementations are as follows.

Before the obtaining a target sample feature map corresponding to the initial sample feature map according to position information of each initial sample feature in the initial sample feature map and a position relationship between the each initial sample feature and other initial sample features, the implementation further includes: performing dimension reduction on the initial sample feature map according to a preset dimension reduction method, to obtain a dimensionally reduced initial sample feature map.

The preset dimension reduction method can be set according to actual application, which is not limited in the present disclosure. For example, the preset dimension reduction method can be understood as performing dimension reduction on a number of channels of three-dimensional data.

In addition, in order to increase complexity of the image processing model and further improve accuracy of subsequent use of the image processing model, the self-attention mechanism layer can be added behind a plurality of convolutional layers.

Specifically, there are at least two self-attention mechanism layers, and each self-attention mechanism layer is arranged behind the convolutional layer.

Using an example in which at least two self-attention mechanism layers are three layers, first, the initial sample feature map is inputted to a first self-attention mechanism layer of the encoder, and in the first self-attention mechanism layer, the target sample feature map corresponding to the initial sample feature map is obtained according to the above calculation method. The target sample feature map is inputted to a next convolutional layer to convolve, to obtain a convolved feature map. The convolved feature map is inputted to a next self-attention mechanism layer for calculation, to output a corresponding target sample feature map. This process is iterated until a target sample feature map outputted by a last self-attention mechanism layer is obtained.

At step 204, the initial feature map is inputted to a self-attention mechanism layer of the encoder, and a target feature map corresponding to the initial feature map is obtained according to position information of each feature in the initial feature map and a position relationship between the each feature and other features.

Specifically, processing of the initial feature map in the self-attention mechanism layer, and a specific processing method of obtaining the target feature map may be referred to detailed descriptions in the image processing model training in the above embodiments, and details are not repeated herein.

After the initial feature map of the to-be-processed image is obtained, the initial feature map is inputted to a self-attention mechanism layer of an encoder of a preprocessed image processing model. The target feature map corresponding to the initial feature map is obtained according to the position information of each feature in the initial feature map, and the position relationship between each feature and other features.

In the self-attention mechanism layer, a specific implementation of obtaining the target feature map corresponding to the initial feature map according to the position information of each feature in the initial feature map, and the position relationship between each feature and other features may be referred to the above description, and details are not repeated herein.

At step 206, the target feature map is inputted to the decoder for processing, to obtain an object segmentation map and an object label of the target object in the to-be-processed image.

After the target feature map is obtained, the target feature map is inputted to the decoder for processing, and the object segmentation map and the object label of the target object in the to-be-processed image are obtained.

Specifically, the obtaining the object segmentation map and the object label of the target object in the to-be-processed image includes: obtaining the object segmentation map of the target object in the to-be-processed image, and a segmentation label of each segmentation block in the object segmentation map; and calculating volumes of segmentation blocks having the same segmentation label, and determining the object label of the target object according to volumes of segmentation blocks corresponding to each type of segmentation labels.

Following the above example, in a case that the to-be-processed image is the CT image of the esophagus, the object segmentation map of the target object in the to-be-processed image may be understood as an esophageal segmentation map, and a segmentation label of each segmentation block in the esophageal segmentation map may be understood as a pathological condition of each segmentation block, such as normal, benign, or cancerous.

Then, volumes of segmentation blocks having the same segmentation label are calculated, and the object label of the target object is determined according to volumes of segmentation blocks corresponding to each type of segmentation labels.

For example, a volume of a segmentation block whose segmentation label is normal, a volume of a segmentation block whose segmentation label is benign, and a volume of a segmentation block whose segmentation label is cancerous are calculated. If the volume of the normal segmentation block is greater than the volume of the benign segmentation block, and the volume of the segmentation block whose segmentation label is cancerous, then the object label of the esophagus can be considered as normal.

Certainly, in actual application, the object label of the target object can also be determined by other rules according to a volume of a segmentation block corresponding to each type of segmentation label. For example, in a case that the volume of the normal segmentation block is greater than the preset volume threshold, the object label of the esophagus may also be considered as normal.

In a specific implementation, a specific implementation of determining the object label of the target object according to the volume of the segmentation block may be set according to actual application, which is not limited in the embodiments of the present disclosure.

In a possible implementation, a three-dimensional CT image of each esophagus can be classified into three target labels, such as cancerous, benign, or normal through the image processing model. In order to achieve an interpretable classification, a simple and non-parametric method is used for giving a final spatial-level decision. First, a voxel map of all esophagus predicted as normal esophagus and esophageal abnormalities (cancerous+benign tumor) is constructed, and all connected components in the map are calculated. Only a maximum connected volume is retained, and a smaller segmentation result is removed. If a three-dimensional volume of the esophageal abnormality is less than K mm$^3$, it is considered as normal, and K is adjusted to reach 99% specificity on a validation set. To further classify an abnormal case as cancerous or benign, a category of a largest volume may be selected as a final classification label.

In addition, if the image processing model is obtained by pre-training before object segmentation map and object label predictions are performed on the to-be-processed image according to the image processing method, the object segmentation map and the object label of the target object in the to-be-processed image can be directly obtained according to the image processing model. Specific implementations are as follows.

After the obtaining a to-be-processed image of a target object, the implementation further includes: inputting the to-be-processed image to the image processing model, to obtain the object segmentation map and the object label of the target object in the to-be-processed image.

The image processing method provided in the embodiments of the present disclosure provides a novel position-sensitive self-attention mechanism. When the object segmentation map of the target object in the to-be-processed image is predicted, prediction accuracy of a model is enhanced through such non-local interaction according to a position relationship between each feature in the initial feature map of the to-be-processed image and other features of a global image. When the mechanism is applied to a scene of esophageal cancer screening, an early-stage cancer can be identified accurately by such non-invasive method, and sensitivity is also relatively high.

Figure 3:
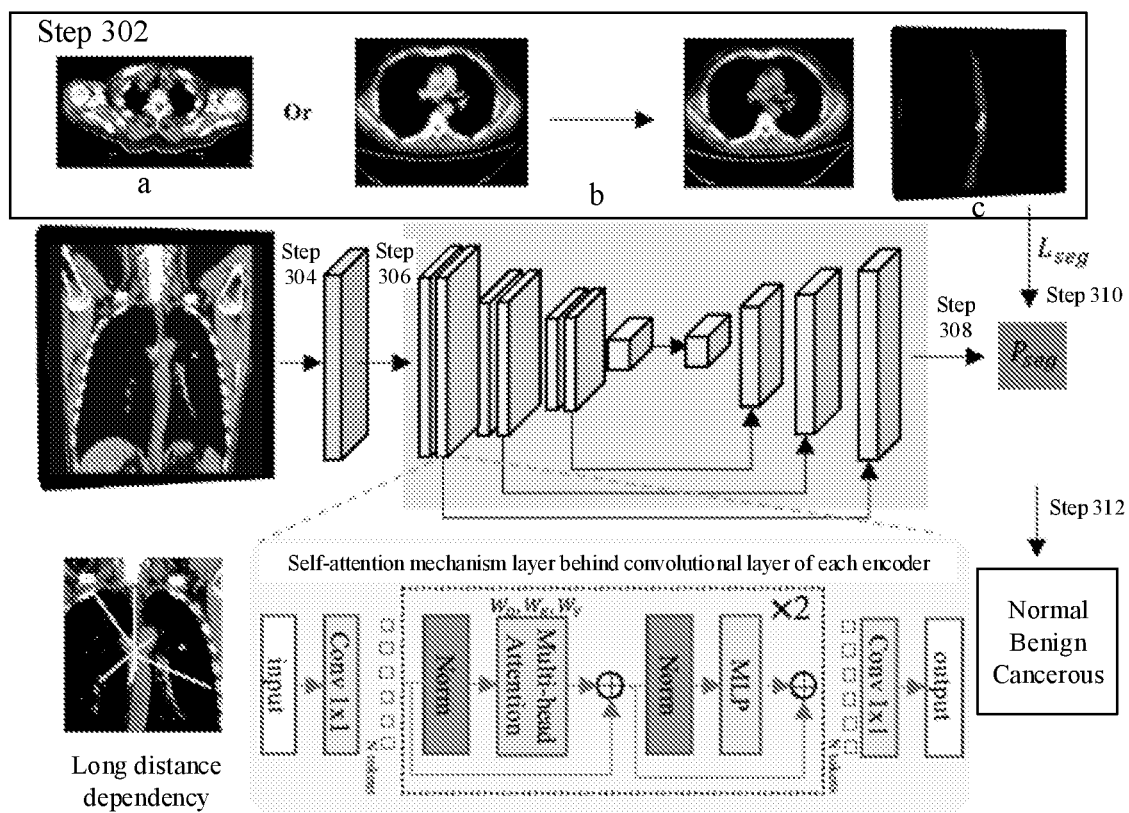
FIG. 3 is a flowchart illustrating a processing process of an image processing method, according to some embodiments of the present disclosure.

An example in which the image processing method provided in the present disclosure is applied to the esophageal cancer screening scenario is used for further describing the image processing method with reference to FIG. 3. FIG. 3 is a flowchart illustrating a processing process of an image processing method according to an embodiment of the present disclosure, and specifically includes the following steps 302 to 312.

At step 302, an esophageal CT image of a historical patient is obtain, and an esophageal segmentation map and an esophageal pathological label of the esophageal CT image are determined.

Specifically, a training data set is composed according to the esophageal CT image, an esophageal segmentation map of each esophageal CT image, and the esophageal pathological label, and the image processing model is trained through the training data set.

Specifically, training for the image processing model may be understood as three types of classification problems for the esophageal CT image. First, the training data set is obtained, and the data set is identified as S={((X$_i$, Y$_i$, P$_i$))|i=1, 2, . . . N}, wherein X$_i$ ∈ R$^{H_i \times W_i \times D_i}$ is a three-dimensional plain esophageal CT image of an i$^{th}$ patient, Y$_i$ ∈ $\mathcal{L}^{H_i \times W_i \times D_i}$ is a voxel-level annotation label (that is, esophageal segmentation map) having the same size of H$_i$×W$_i$×D$_i$ as X$_i$, representing a segmentation target: background, esophageal cancer, normal, and benign tumor. In order to obtain an annotation label in Y, a three-dimensional plain esophageal CT image of a patient accepting radiotherapy CT can be implemented by directly using a gross tumor volume (GTV) sketch performed on the three-dimensional plain esophageal CT image by a doctor during radiotherapy. For a three-dimensional plain esophageal CT image of another patient, a tumor annotation made by the doctor on an esophageal contrast enhanced CT image can be used for completing annotation with reference to clinical and an endoscopic report. Then a robust image registration method is used for registering an annotated mask from a contrast enhanced CT image to a plain CT image, which is manually corrected during quality check. P$_i$ ∈ $\mathcal{L}$ is a label of the patient, that is, an esophageal pathological label corresponding to the three-dimensional plain esophageal CT image of the patient, such as esophageal cancer, benign, and normal, and the esophageal pathological label can be obtained through pathology and radiology reports.

Part a in FIG. 3 represents the three-dimensional plain esophageal CT image, part b represents a process of registering from the esophageal contrast enhanced CT image to the plain CT image, and part c represents a voxel-level annotation label of the three-dimensional plain esophageal CT image, that is, the esophageal segmentation map.

At step 304, the esophageal CT image is inputted to a first convolutional layer of the encoder of the image processing model, to obtain a first feature map of the esophageal CT image.

At step 306, the first feature map is inputted to a second convolutional layer, to obtain a second feature map, and the second feature map is used as an initial feature map to input to a self-attention mechanism layer behind the second convolutional layer.

Specifically, after the initial feature map is inputted (input in FIG. 3) to the self-attention mechanism layer, 1*1 convolution (dimension reduction, Conv1*1 in FIG. 3), first normalization (Norm in FIG. 3), multi-head self-attention mechanism (Multi-head Attention in FIG. 3), second normalization (Norm in FIG. 3), multilayer perceptron (MLP), 1*1 convolution (recovery, Cony1*1 in FIG. 3), and the like are performed on the initial feature map in the self-attention mechanism layer, and a target feature map having the same size with the input is outputted (output in FIG. 3).

In practical application, in order to increase model complexity of the self-attention mechanism layer, the same processing can be performed twice in a self-attention mechanism layer, to improve accuracy of the image processing model obtained by training.

At step 308, a final target feature map outputted by the self-attention mechanism layer is inputted to the decoder of the image processing model, to obtain a predicted esophageal segmentation map and a predicted esophageal pathological label of the esophageal CT image.

At step 310, the image processing model is trained according to a loss function $L_{seg}$ composed of the predicted esophageal segmentation map, the predicted esophageal pathological label, and the esophageal segmentation map and esophageal pathological label, to obtain the image processing model.

At step 312, in actual application, a to-be-predicted esophageal CT image is inputted to the image processing model, to obtain an esophageal segmentation map and an esophageal pathological label of the to-be-predicted esophageal CT image.

The esophageal pathological label includes labels such as normal, cancerous, or benign.

The image processing method provided in the embodiments of the present disclosure provides a relatively convenient and simple non-contrast CT scanning method for screening the esophageal cancer. In order to better capture a global background and detect the early-stage tumor, a position-sensitive self-attention mechanism is provided, to enhance the convolutional layer through non-local interaction in the encoder. High sensitivity and specificity are achieved on a large-scale data set. Compared with other tools such as blood test and endoscopy, it is more feasible to perform large-scale opportunistic screening for the esophageal cancer by using non-contrast CT scan.

Figure 4:
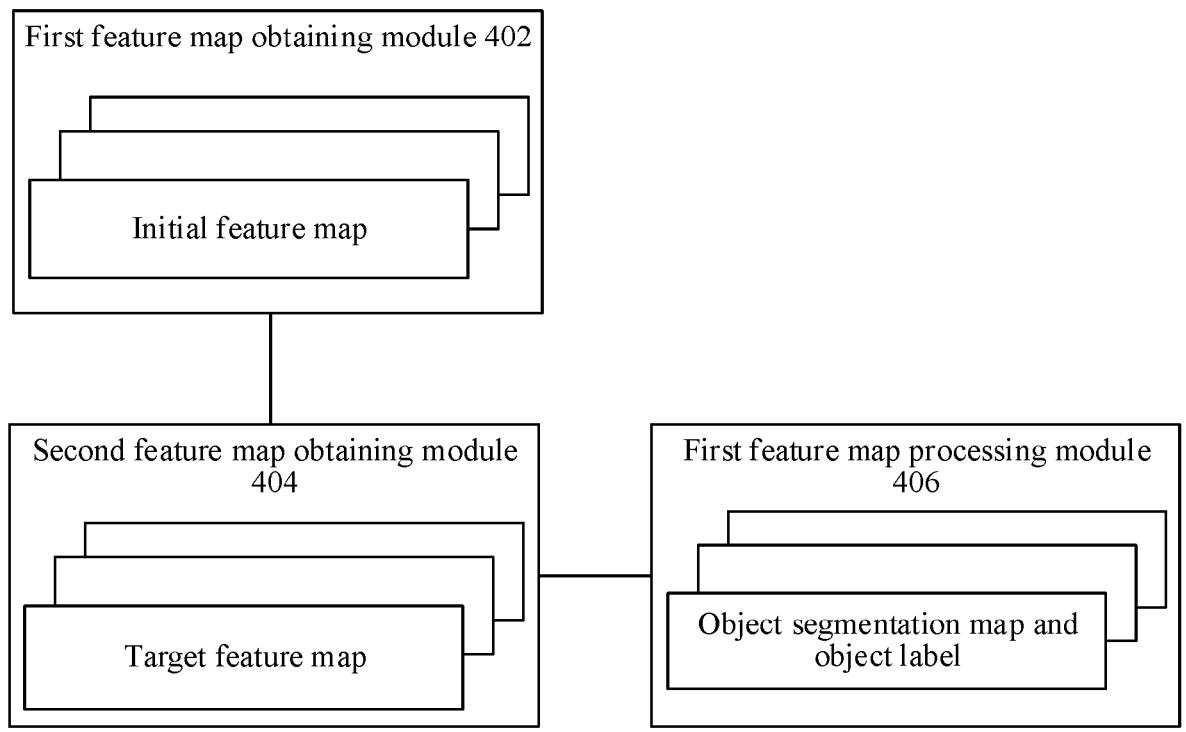
FIG. 4 is a schematic structural diagram of an image processing apparatus, according to some embodiments of the present disclosure.

Corresponding to the above method embodiments, the present disclosure further provides embodiments of an image processing apparatus, and FIG. 4 is a schematic structural diagram of an image processing apparatus, according to some embodiments of the present disclosure. As shown in FIG. 4, the apparatus includes a first feature map obtaining module 402, a second feature map obtaining module 404, and a first feature map processing module 406.

First feature map obtaining module 402 is configured to obtain a to-be-processed image including a target object and input the to-be-processed image to a convolutional layer of an image processing model, to obtain an initial feature map of the to-be-processed image, where the image processing model includes an encoder and a decoder.

Second feature map obtaining module 404 is configured to input the initial feature map to a self-attention mechanism layer of the encoder, and obtain a target feature map corresponding to the initial feature map according to position information of each feature in the initial feature map and a position relationship between the each feature and other features.

First feature map processing module 406 is configured to input the target feature map to the decoder for processing, to obtain an object segmentation map and an object label of the target object in the to-be-processed image.

Optionally, the apparatus includes a model training module. The model training module is configured to obtain a sample image including a sample object, and determine a sample object segmentation map and a sample object label of the sample object in the sample image; input the sample image to a convolutional layer of the encoder, to obtain an initial sample feature map of the sample image; input the initial sample feature map to the self-attention mechanism layer of the encoder, and obtain a target sample feature map corresponding to the initial sample feature map according to position information of each initial sample feature in the initial sample feature map and a position relationship between the each initial sample feature and other initial sample features; input the target sample feature map to the decoder for processing, to obtain a predicted object segmentation map and a predicted object label of the sample object in the sample image; and train the image processing model according to a loss function composed of the sample object segmentation map and the sample object label, and the predicted object segmentation map and the predicted object label.

Optionally, the model training module is further configured to determine a coordinate grid of the initial sample feature map, and determine position information of each initial sample feature in the initial sample feature map according to the coordinate grid; calculate, by using a first preset algorithm, a target sample feature corresponding to the each initial sample feature according to the position information of the each initial sample feature and the position relationship between the each initial sample feature and other initial sample features; and obtain the target sample feature map corresponding to the initial sample feature map according to the target sample feature.

Optionally, the model training module is further configured to determine a coordinate grid of the initial sample feature map, and determine position information of each initial sample feature in the initial sample feature map according to the coordinate grid; determine an associated region of the each initial sample feature and an associated sample feature of the associated region according to the position information; calculate, by using a second preset algorithm, a target sample feature corresponding to the each initial sample feature according to the position information of the each initial sample feature and a position relationship between the each initial sample feature and the associated sample feature; and obtain the target sample feature map corresponding to the initial sample feature map according to the target sample feature.

Optionally, the model training module is further configured to determine an associated distance between the each initial sample feature and the other initial sample features according to the position information of the each initial sample feature; and determine the associated region of the each initial sample feature according to the associated distance, and determine each initial sample feature in the associated region as the associated sample feature.

Optionally, the model training module is further configured to calculate, by using the second preset algorithm, the target sample feature corresponding to the each initial sample feature according to the position information of the each initial sample feature and an associated distance between the each initial sample feature and the associated sample feature.

Optionally, the apparatus further includes a dimension reduction module, configured to perform dimension reduction on the initial sample feature map according to a preset dimension reduction method, to obtain a dimensionally reduced initial sample feature map.

Optionally, there are at least two self-attention mechanism layers, and each self-attention mechanism layer is arranged behind the convolutional layer.

Optionally, the apparatus further includes a model processing module, configured to input the to-be-processed image to the image processing model, to obtain the object segmentation map and the object label of the target object in the to-be-processed image.

Optionally, the first feature map processing module 406 is further configured to obtain the object segmentation map of the target object in the to-be-processed image, and a segmentation label of each segmentation block in the object segmentation map; and calculate volumes of segmentation blocks having the same segmentation label and determine the object label of the target object according to volumes of segmentation blocks corresponding to each type of segmentation labels.

Optionally, the model training module is further configured to determine at least two contrast enhanced sample images including the sample object; and determine the sample object segmentation map and the sample object label of the sample object in the sample image according to a sample annotation of the sample object in the at least two contrast enhanced sample images.

Optionally, the to-be-processed image including the target object is the CT image including the esophagus.

According to the image processing apparatus provided in the embodiments of the present disclosure, a novel position-sensitive self-attention mechanism is provided. When the object segmentation map of the target object in the to-be-processed image is predicted, prediction accuracy of a model is enhanced through such non-local interaction according to a position relationship between each feature in the initial feature map of the to-be-processed image and other features of a global image. When the mechanism is applied to a scene of esophageal cancer screening, an early-stage cancer can be identified accurately by such non-invasive method, and sensitivity is also relatively high.

An exemplary solution of an image processing apparatus according to the embodiments is described above. It should be noted that technical solutions of the image processing apparatus and the foregoing image processing method belong to the same concept. Detailed contents that are not described in detail in the technical solution of the image processing apparatus may be referred to descriptions of the technical solution of the foregoing image processing method.

Figure 5:
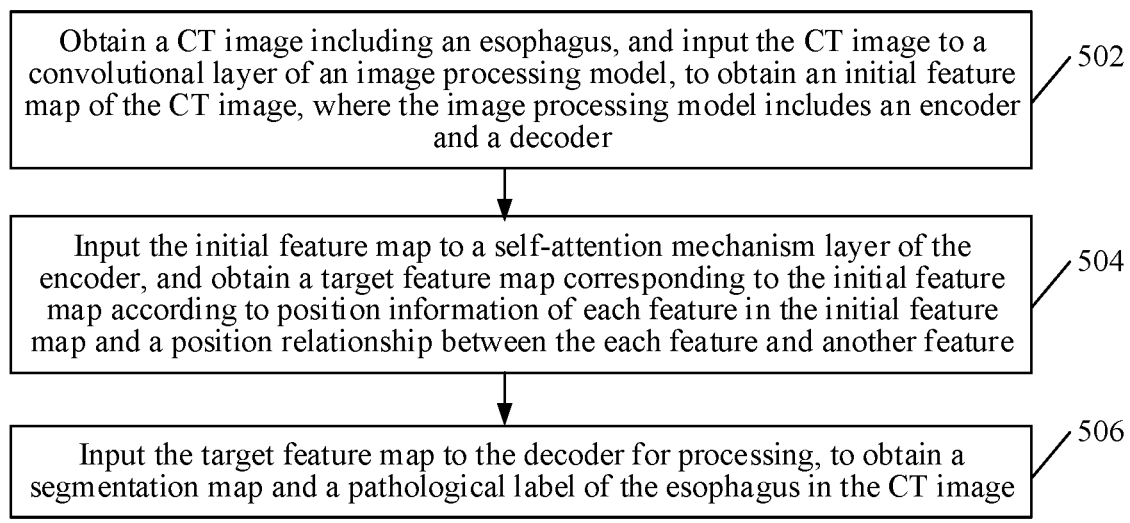
FIG. 5 is a flowchart of an esophageal CT (Computer Tomography) image processing method, according to some embodiments of the present disclosure.

FIG. 5 is a flowchart of an esophageal CT image processing method, according to some embodiments of the present disclosure, and specifically includes the following steps 502 to 506.

At step 502, a CT image including an esophagus is obtained, and the CT image is inputted to a convolutional layer of an image processing model, to obtain an initial feature map of the CT image, where the image processing model includes an encoder and a decoder.

At step 504, the initial feature map is inputted to a self-attention mechanism layer of the encoder, and a target feature map corresponding to the initial feature map is obtained according to position information of each feature in the initial feature map and a position relationship between the each feature and other features.

At step 506, the target feature map is inputted to the decoder for processing, to obtain a segmentation map and a pathological label of the esophagus in the CT image.

According to the esophageal CT image processing method provided in the embodiments of the present disclosure, a relatively convenient and simple non-contrast CT scanning method for screening the esophageal cancer is provided. In order to better capture a global background and detect the early-stage tumor, a position-sensitive self-attention mechanism is provided, to enhance the convolutional layer through non-local interaction in the encoder. High sensitivity and specificity are achieved on a large-scale data set. Compared with other tools such as blood test and endoscopy, it is more feasible to perform large-scale opportunistic screening for the esophageal cancer by using non-contrast CT scan.

An exemplary solution of an esophageal CT image processing method according to the embodiments is described above. It should be noted that technical solutions of the esophageal CT image processing method and the foregoing image processing method belong to the same concept. Detailed contents that are not described in detail in the technical solution of the esophageal CT image processing method may all be referred to descriptions of the technical solution of the foregoing image processing method.

Figure 6:
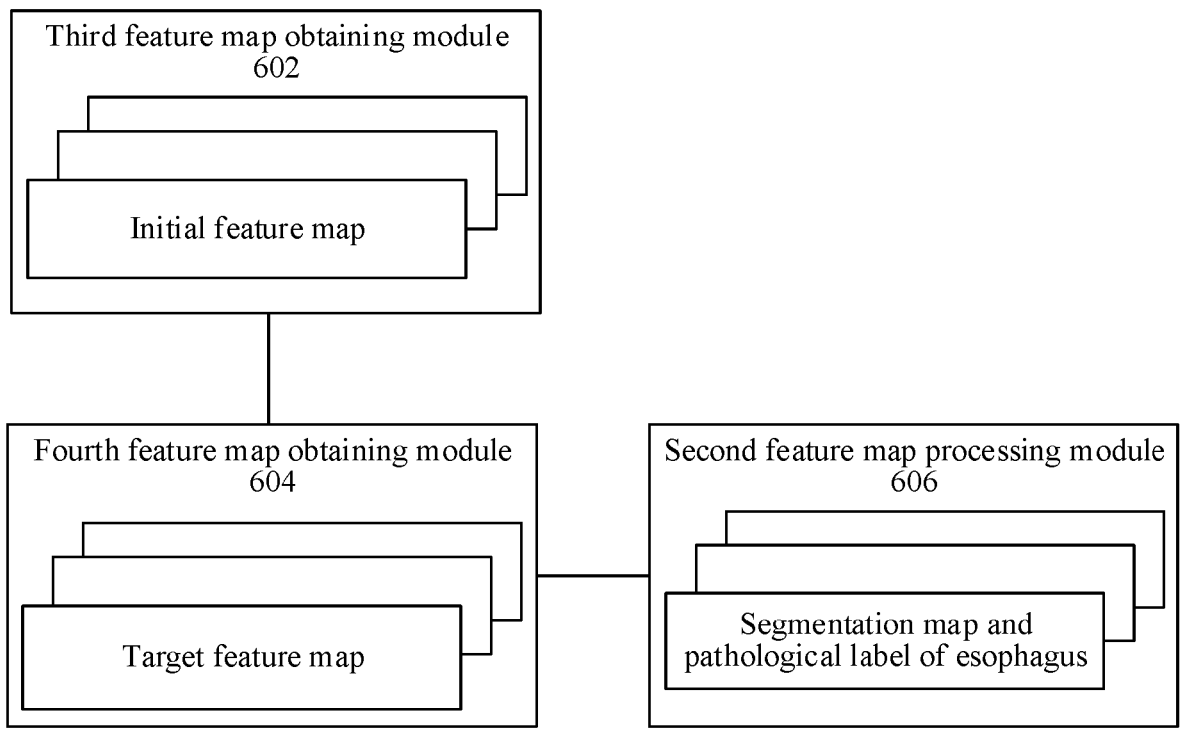
FIG. 6 is a schematic structural diagram of an esophageal CT image processing apparatus, according to some embodiments of the present disclosure.

FIG. 6 is a schematic structural diagram of an esophageal CT image processing apparatus, according to some embodiments of the present disclosure. The apparatus includes a third feature map obtaining module 602, a fourth feature map obtaining module 604, and a second feature map processing module 606.

Third feature map obtaining module 602 is configured to obtain a CT image including an esophagus and input the CT image to a convolutional layer of an image processing model, to obtain an initial feature map of the CT image, where the image processing model includes an encoder and a decoder.

Fourth feature map obtaining module 604 is configured to input the initial feature map to a self-attention mechanism layer of the encoder, and obtain a target feature map corresponding to the initial feature map according to position information of each feature in the initial feature map and a position relationship between the each feature and other features; and Second feature map processing module 606 is configured to input the target feature map to the decoder for processing, to obtain a segmentation map and a pathological label of the esophagus in the CT image.

According to the esophageal CT image processing apparatus provided in the embodiments of the present disclosure, a relatively convenient and simple non-contrast CT scanning method for screening the esophageal cancer is provided. In order to better capture a global background and detect the early-stage tumor, a position-sensitive self-attention mechanism is provided, to enhance the convolutional layer through non-local interaction in the encoder. High sensitivity and specificity are achieved on a large-scale data set. Compared with other tools such as blood test and endoscopy, it is more feasible to perform large-scale opportunistic screening for the esophageal cancer by using non-contrast CT scan.

An exemplary solution of an esophageal CT image processing apparatus according to the embodiments is described above. It should be noted that, technical solutions of the esophageal CT image processing apparatus and the foregoing esophageal CT image processing method belong to the same concept. Detailed contents that are not described in detail in the technical solution of the esophageal CT image processing apparatus may all be referred to descriptions of the technical solution of the foregoing esophageal CT image processing method.

Figure 7:
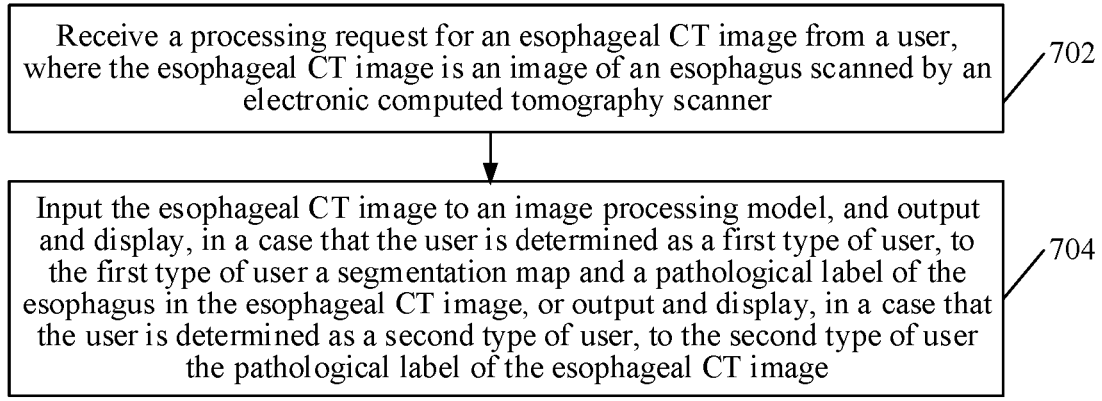
FIG. 7 is a flowchart of another esophageal CT image processing method, according to some embodiments of the present disclosure.

FIG. 7 is a flowchart of another esophageal CT image processing method, according to some embodiments of the present disclosure, and specifically includes the following steps 702 and 704.

At step 702, a processing request for an esophageal CT image is received from a user, where the esophageal CT image is an image of an esophagus scanned by an electronic computed tomography scanner.

At step 704, the esophageal CT image is inputted to an image processing model, and output and display, in a case that the user is determined as a first type of user, to the first type of user a segmentation map and a pathological label of the esophagus in the esophageal CT image, or output and display, in a case that the user is determined as a second type of user, to the second type of user the pathological label of the esophageal CT image, where the image processing model is the image processing model in the foregoing image processing method.

Specifically, the user may be understood as any type of user, such as a doctor or non-doctor common people. The esophageal CT image processing method displays different results for different types of users.

If a first type of user is the doctor, the esophageal segmentation map and the pathological label of the esophageal CT image may be displayed to the doctor. The doctor may analyze a condition of an esophageal patient according to the esophageal segmentation map and the pathological label. If a second type of user is a common user, that is, not a professional doctor, the pathological label can be directly displayed.

In a specific implementation, in a case that the user is the doctor, the user may directly obtain the esophageal CT image scanned by CT, input it to a computer terminal, and send the esophageal CT image to a server through the computer terminal. The server may obtain the segmentation map and the pathological label of the esophageal CT image to return to the computer terminal according to the foregoing image processing method, and display to the user through the computer terminal. In a case that the user is a common user, the user may take an image of the esophagus scanned by the computed tomography scanner and input it to the computer terminal or input an image of the esophagus scanned by the computed tomography scanner obtained by other means to the computer terminal, and send the esophageal CT image to the server through the computer terminal. The server may obtain the pathological label of the esophageal CT image to return to the computer terminal according to the foregoing image processing method, and display to the user through the computer terminal.

According to the esophageal CT image processing method provided in the embodiments of the present disclosure, a relatively convenient and simple non-contrast CT scanning method for screening the esophageal cancer is provided. In order to better capture a global background and detect the early-stage tumor, a position-sensitive self-attention mechanism is provided, to enhance the convolutional layer through non-local interaction in the encoder. High sensitivity and specificity are achieved on a large-scale data set. Compared with other tools such as blood test and endoscopy, it is more feasible to perform large-scale opportunistic screening for the esophageal cancer by using non-contrast CT scan. In addition, according to an interaction request of the user, different prediction results can be returned to the user through the image processing model according to a type of the user, to improve diversity of method implementation thereof.

Figure 8:
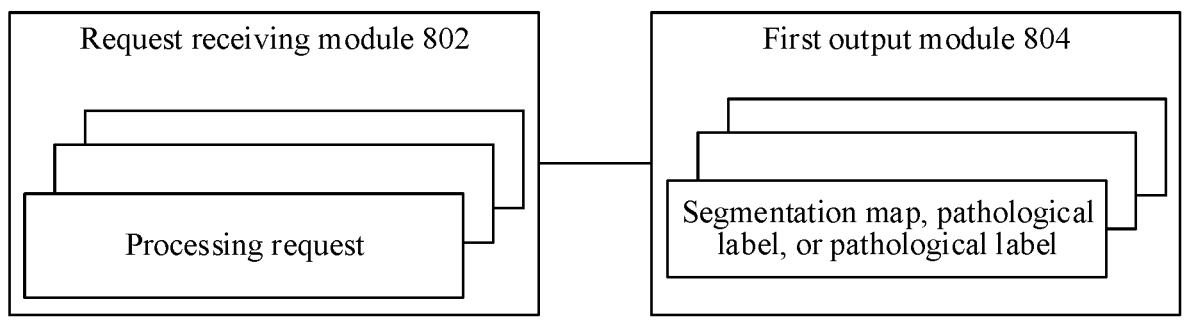
FIG. 8 is a schematic structural diagram of another esophageal CT image processing apparatus, according to some embodiments of the present disclosure.

FIG. 8 is a schematic structural diagram of another esophageal CT image processing apparatus, according to some embodiments of the present disclosure. The apparatus includes a request receiving module 802 and a first output module 804.

Request receiving module 802 is configured to receive a processing request for an esophageal CT image from a user, where the esophageal CT image is an image of an esophagus scanned by an electronic computed tomography scanner.

First output module 804 is configured to input the esophageal CT image to an image processing model, and output and display, in a case that the user is determined as a first type of user, to the first type of user a segmentation map and a pathological label of the esophagus in the esophageal CT image, or output and display, in a case that the user is determined as a second type of user, to the second type of user the pathological label of the esophageal CT image, where the image processing model is the image processing model in the foregoing image processing method.

According to the esophageal CT image processing apparatus provided in the embodiments of the present disclosure, a relatively convenient and simple non-contrast CT scanning method for screening the esophageal cancer is provided. In order to better capture a global background and detect the early-stage tumor, a position-sensitive self-attention mechanism is provided, to enhance the convolutional layer through non-local interaction in the encoder. High sensitivity and specificity are achieved on a large-scale data set. Compared with other tools such as blood test and endoscopy, it is more feasible to perform large-scale opportunistic screening for the esophageal cancer by using non-contrast CT scan. In addition, according to an interaction request of the user, different prediction results can be returned to the user through the image processing model according to a type of the user, to improve diversity of method implementation thereof.

Figure 9:
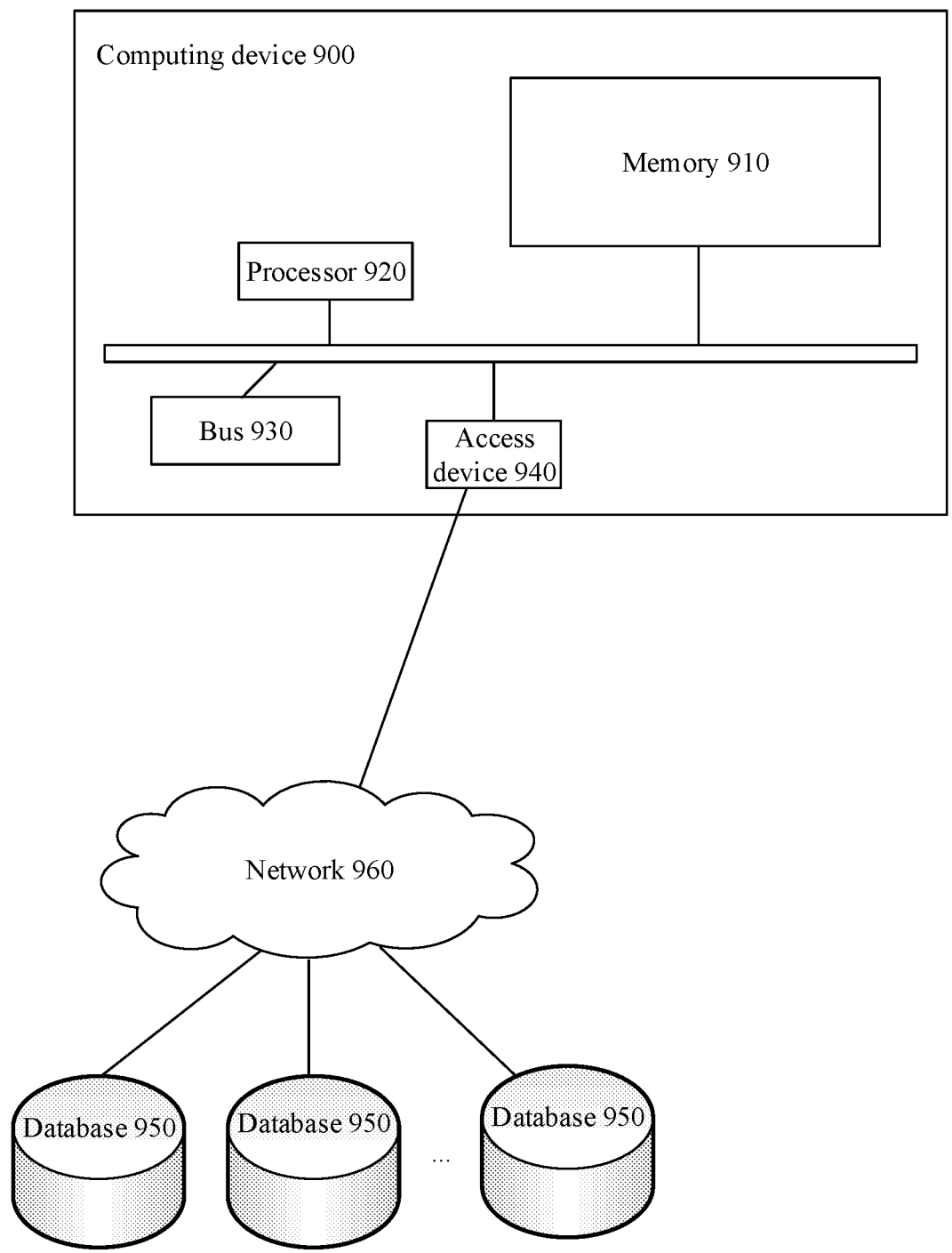
FIG. 9 is a structural block diagram of a computing device, according to some embodiments of the present disclosure.

FIG. 9 is a structural block diagram of a computing device 900, according to some embodiments of the present disclosure. Components of the computing device 900 include, but are not limited to, a memory 910 and a processor 920. The processor 920 and the memory 910 are connected through a bus 930, and a database 950 is used for storing data.

The computing device 900 further includes an access device 940, and the access device 940 enables the computing device 900 to communicate through one or more networks 960. Examples of the networks include a public switched telephone network (PSTN), a local area network (LAN), a wide area network (WAN), a personal area network (PAN), or a combination of communication networks such as the Internet. The access device 940 may include one or more of wired or wireless network interfaces (for example, a network interface card (NIC)) of any types, such as an IEEE802.11 wireless local area network (WLAN) wireless interface, a worldwide interoperability for microwave access (Wi-MAX) interface, an Ethernet interface, a universal serial bus (USB) interface, a cellular network interface, a Bluetooth interface, a near field communication (NFC) interface, and the like.

In some embodiment of the present disclosure, the foregoing components and other components not shown in FIG. 9 of the computing device 900 may be connected, for example, through the bus. It should be understood that the structural block diagram of the computing device shown in FIG. 9 is merely exemplary, and is not intended to limit the scope of the present disclosure. A person skilled in the art may add or replace other components according to a requirement.

The computing device 900 may be a stationary or mobile computing device of any type, including a mobile computer, a mobile computing device (for example, a tablet computer, a person digital assistant, a laptop computer, a notebook, or a netbook), a mobile phone (for example, a smartphone), a wearable computing device (for example, a smartwatch or smart glasses), a mobile device of another type, or a stationary computing device such as a desktop computer or a personal computer (PC). The computing device 900 may alternatively be a mobile or stationary server.

The processor 920 is used for executing the following computer-executable instructions. The computer-executable instructions, when executed by the processor, implement the steps of the foregoing image processing method or esophageal CT image processing method.

An exemplary solution of a computing device according to the embodiments is described above. It should be noted that, technical solutions of the computing device and the foregoing image processing method or the esophageal CT image processing method belong to the same concept. Detailed contents that are not described in detail in the technical solution of the computing device may all be referred to descriptions of the technical solution of the foregoing image processing method or the esophageal CT image processing method.

An embodiment of the present disclosure further provides a computer-readable storage medium storing computer-executable instructions. The computer-executable instructions, when executed by a processor, implement the steps of the foregoing image processing method or esophageal CT image processing method.

An exemplary solution of a computer-readable storage medium according to the embodiments is described above. It should be noted that, technical solutions of the storage medium and the foregoing image processing method or the esophageal CT image processing method belong to the same concept. Detailed contents that are not described in detail in the technical solution of the storage medium may all be referred to descriptions of the technical solution of the foregoing image processing method or the esophageal CT image processing method.

Some embodiments of the present disclosure further provide a computer program. When the computer program is executed in a computer, the computer is caused to perform the steps of the foregoing image processing method or esophageal CT image processing method.

An exemplary solution of a computer program according to the embodiments is described above. It should be noted that technical solutions of the computer program and the foregoing image processing method or the esophageal CT image processing method belong to the same concept. Detailed contents that are not described in detail in the technical solution of the computer program may all be referred to descriptions of the technical solution of the foregoing image processing method or the esophageal CT image processing method.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. An image processing method, comprising:
obtaining a to-be-processed image comprising a target object;
inputting the to-be-processed image to a convolutional layer of an image processing model to obtain an initial feature map of the to-be-processed image, wherein the image processing model comprises an encoder and a decoder;
inputting the initial feature map to a self-attention mechanism layer of the encoder to obtain a target feature map corresponding to the initial feature map according to position information of each feature in the initial feature map and a position relationship between the each feature and other features; and
inputting the target feature map to the decoder for processing, to obtain an object segmentation map and an object label of the target object in the to-be-processed image;
wherein the image processing model is trained by:
obtaining a sample image comprising a sample object, and determining a sample object segmentation map and a sample object label of the sample object in the sample image; inputting the sample image to a convolutional layer of the encoder, to obtain an initial sample feature map of the sample image;
inputting the initial sample feature map to the self-attention mechanism layer of the encoder;
obtaining a target sample feature map corresponding to the initial sample feature map according to position information of each initial sample feature in the initial sample feature map and a position relationship between the each initial sample feature and other initial sample features;
inputting the target sample feature map to the decoder for processing, to obtain a predicted object segmentation map and a predicted object label of the sample object in the sample image; and
training the image processing model according to a loss function composed of the sample object segmentation map and the sample object label, and the predicted object segmentation map and the predicted object label;
wherein obtaining the target sample feature map corresponding to the initial sample feature map according to position information of each initial sample feature in the initial sample feature map and a position relationship between the each initial sample feature and other initial sample features comprises:
determining a coordinate grid of the initial sample feature map, and determining position information of each initial sample feature in the initial sample feature map according to the coordinate grid;
calculating, by using a first preset algorithm, a target sample feature corresponding to the each initial sample feature according to the position information of the each initial sample feature and the position relationship between the each initial sample feature and the other initial sample features; and
obtaining the target sample feature map corresponding to the initial sample feature map according to the target sample feature;
or
wherein obtaining the target sample feature map corresponding to the initial sample feature map according to position information of each initial sample feature in the initial sample feature map and a position relationship between the each initial sample feature and other initial sample features comprises:
determining a coordinate grid of the initial sample feature map, and determining position information of each initial sample feature in the initial sample feature map according to the coordinate grid;
determining an associated region of the each initial sample feature and an associated sample feature of the associated region according to the position information;
calculating, by using a second preset algorithm, a target sample feature corresponding to the each initial sample feature according to the position information of the each initial sample feature and a position relationship between the each initial sample feature and the associated sample feature; and
obtaining the target sample feature map corresponding to the initial sample feature map according to the target sample feature.

2. The image processing method according to claim 1, wherein obtaining the object segmentation map and the object label of the target object in the to-be-processed image comprises:
obtaining the object segmentation map of the target object in the to-be-processed image, and a segmentation label of each segmentation block in the object segmentation map; and
calculating volumes of segmentation blocks having the same segmentation label, and
determining the object label of the target object according to volumes of segmentation blocks corresponding to each type of segmentation labels.

3. The image processing method according to claim 1, wherein the target object is an esophagus, the to-be-processed image is a computed tomography (CT) image, and the object label is a pathological label.

4. The image processing method according to claim 1, wherein obtaining the to-be-processed image comprising a target object comprises:
receiving a processing request for an esophageal CT image from a user, wherein the esophageal CT image is an image of an esophagus scanned by an electronic computed tomography scanner and the esophageal CT image is the to-be-processed image; and
after inputting the target feature map to the decoder for processing, to obtain an object segmentation map and an object label of the target object in the to-be-processed image further comprises:
outputting and displaying, in a case that the user is determined as a first type of user, to the first type of user a segmentation map and a pathological label of the esophagus in the esophageal CT image, or outputting and displaying, in a case that the user is determined as a second type of user, to the second type of user the pathological label of the esophageal CT image.

5. The image processing method according to claim 1, wherein determining the associated region of the each initial sample feature and the associated sample feature of the associated region according to the position information comprises:
   determining an associated distance between the each initial sample feature and the other initial sample features according to the position information of the each initial sample feature; and
   determining the associated region of the each initial sample feature according to the associated distance, and determining each initial sample feature in the associated region as the associated sample feature.

6. The image processing method according to claim 1, wherein the calculating, by using the second preset algorithm, the target sample feature corresponding to the each initial sample feature according to the position information of the each initial sample feature and the position relationship between the each initial sample feature and the associated sample feature comprises:
   calculating, by using the second preset algorithm, the target sample feature corresponding to the each initial sample feature according to the position information of the each initial sample feature and an associated distance between the each initial sample feature and the associated sample feature.

7. The image processing method according to claim 1, wherein before obtaining the target sample feature map corresponding to the initial sample feature map according to position information of each initial sample feature in the initial sample feature map and the position relationship between the each initial sample feature and other initial sample features, the method further comprises:
   performing dimension reduction on the initial sample feature map according to a preset dimension reduction method, to obtain a dimensionally reduced initial sample feature map.

8. The image processing method according to claim 1, wherein the image processing model least comprises two self-attention mechanism layers, and each self-attention mechanism layer is arranged behind the convolutional layer.

9. The image processing method according to claim 1, wherein after obtaining a to-be-processed image of a target object, the method further comprises:
   inputting the to-be-processed image to the image processing model, to obtain the object segmentation map and the object label of the target object in the to-be-processed image.

10. The image processing method according to claim 1, wherein determining the sample object segmentation map and the sample object label of the sample object in the sample image comprises:
    determining at least two contrast enhanced sample images comprising the sample object; and
    determining the sample object segmentation map and the sample object label of the sample object in the sample image according to a sample annotation of the sample object in the at least two contrast enhanced sample images.

11. An apparatus for performing image processing, the apparatus comprising:
    a memory configured to store instructions; and
    one or more processors configured to execute the instructions to cause the apparatus to perform:
    obtaining a to-be-processed image comprising a target object;
    inputting the to-be-processed image to a convolutional layer of an image processing model to obtain an initial feature map of the to-be-processed image, wherein the image processing model comprises an encoder and a decoder;
    inputting the initial feature map to a self-attention mechanism layer of the encoder to obtain a target feature map corresponding to the initial feature map according to position information of each feature in the initial feature map and a position relationship between the each feature and other features; and
    inputting the target feature map to the decoder for processing, to obtain an object segmentation map and an object label of the target object in the to-be-processed image;
    wherein the image processing model is trained by:
        obtaining a sample image comprising a sample object, and determining a sample object segmentation map and a sample object label of the sample object in the sample image; inputting the sample image to a convolutional layer of the encoder, to obtain an initial sample feature map of the sample image;
        inputting the initial sample feature map to the self-attention mechanism layer of the encoder;
        obtaining a target sample feature map corresponding to the initial sample feature map according to position information of each initial sample feature in the initial sample feature map and a position relationship between the each initial sample feature and other initial sample features;
        inputting the target sample feature map to the decoder for processing, to obtain a predicted object segmentation map and a predicted object label of the sample object in the sample image; and
        training the image processing model according to a loss function composed of the sample object segmentation map and the sample object label, and the predicted object segmentation map and the predicted object label;
    wherein obtaining the target sample feature map corresponding to the initial sample feature map according to position information of each initial sample feature in the initial sample feature map and a position relationship between the each initial sample feature and other initial sample features comprises:
        determining a coordinate grid of the initial sample feature map, and determining position information of each initial sample feature in the initial sample feature map according to the coordinate grid;
        calculating, by using a first preset algorithm, a target sample feature corresponding to the each initial sample feature according to the position information of the each initial sample feature and the position relationship between the each initial sample feature and the other initial sample features; and
        obtaining the target sample feature map corresponding to the initial sample feature map according to the target sample feature; or
    wherein obtaining the target sample feature map corresponding to the initial sample feature map according to position information of each initial sample feature in the initial sample feature map and a position relationship between the each initial sample feature and other initial sample features comprises:
determining a coordinate grid of the initial sample feature map, and determining position information of each initial sample feature in the initial sample feature map according to the coordinate grid;
determining an associated region of the each initial sample feature and an associated sample feature of the associated region according to the position information;
calculating, by using a second preset algorithm, a target sample feature corresponding to the each initial sample feature according to the position information of the each initial sample feature and a position relationship between the each initial sample feature and the associated sample feature; and
obtaining the target sample feature map corresponding to the initial sample feature map according to the target sample feature.

12. The apparatus according to claim 11, wherein the one or more processors are further configured to execute the instructions to cause the apparatus to perform:
obtaining a sample image comprising a sample object, and determining a sample object segmentation map and a sample object label of the sample object in the sample image; inputting the sample image to a convolutional layer of the encoder, to obtain an initial sample feature map of the sample image;
inputting the initial sample feature map to the self-attention mechanism layer of the encoder;
obtaining a target sample feature map corresponding to the initial sample feature map according to position information of each initial sample feature in the initial sample feature map and a position relationship between the each initial sample feature and other initial sample features;
inputting the target sample feature map to the decoder for processing, to obtain a predicted object segmentation map and a predicted object label of the sample object in the sample image; and
training the image processing model according to a loss function composed of the sample object segmentation map and the sample object label, and the predicted object segmentation map and the predicted object label.

13. The apparatus according to claim 11, wherein the target object is an esophagus, the to-be-processed image is a computed tomography (CT) image, and the object label is a pathological label.

14. The apparatus according to claim 11, wherein the one or more processors are further configured to execute the instructions to cause the apparatus to perform:
receiving a processing request for an esophageal CT image from a user, wherein the esophageal CT image is an image of an esophagus scanned by an electronic computed tomography scanner and the esophageal CT image is the to-be-processed image; and
after inputting the target feature map to the decoder for processing, to obtain an object segmentation map and an object label of the target object in the to-be-processed image further comprises:
outputting and displaying, in a case that the user is determined as a first type of user, to the first type of user a segmentation map and a pathological label of the esophagus in the esophageal CT image, or
outputting and displaying, in a case that the user is determined as a second type of user, to the second type of user the pathological label of the esophageal CT image.

15. A non-transitory computer readable medium that stores a set of instructions that is executable by one or more processors of an apparatus to cause the apparatus to perform:
obtaining a to-be-processed image comprising a target object;
inputting the to-be-processed image to a convolutional layer of an image processing model to obtain an initial feature map of the to-be-processed image, wherein the image processing model comprises an encoder and a decoder;
inputting the initial feature map to a self-attention mechanism layer of the encoder to obtain a target feature map corresponding to the initial feature map according to position information of each feature in the initial feature map and a position relationship between the each feature and other features; and
inputting the target feature map to the decoder for processing, to obtain an object segmentation map and an object label of the target object in the to-be-processed image;
wherein the image processing model is trained by:
obtaining a sample image comprising a sample object, and determining a sample object segmentation map and a sample object label of the sample object in the sample image; inputting the sample image to a convolutional layer of the encoder, to obtain an initial sample feature map of the sample image;
inputting the initial sample feature map to the self-attention mechanism layer of the encoder;
obtaining a target sample feature map corresponding to the initial sample feature map according to position information of each initial sample feature in the initial sample feature map and a position relationship between the each initial sample feature and other initial sample features;
inputting the target sample feature map to the decoder for processing, to obtain a predicted object segmentation map and a predicted object label of the sample object in the sample image; and
training the image processing model according to a loss function composed of the sample object segmentation map and the sample object label, and the predicted object segmentation map and the predicted object label;
wherein obtaining the target sample feature map corresponding to the initial sample feature map according to position information of each initial sample feature in the initial sample feature map and a position relationship between the each initial sample feature and other initial sample features comprises:
determining a coordinate grid of the initial sample feature map, and determining position information of each initial sample feature in the initial sample feature map according to the coordinate grid;
calculating, by using a first preset algorithm, a target sample feature corresponding to the each initial sample feature according to the position information of the each initial sample feature and the position relationship between the each initial sample feature and the other initial sample features; and obtaining the target sample feature map corresponding to the initial sample feature map according to the target sample feature; or wherein obtaining the target sample feature map corresponding to the initial sample feature map according to position information of each initial sample feature in the initial sample feature map and a position relationship between the each initial sample feature and other initial sample features comprises:

determining a coordinate grid of the initial sample feature map, and determining position information of each initial sample feature in the initial sample feature map according to the coordinate grid;

determining an associated region of the each initial sample feature and an associated sample feature of the associated region according to the position information;

calculating, by using a second preset algorithm, a target sample feature corresponding to the each initial sample feature according to the position information of the each initial sample feature and a position relationship between the each initial sample feature and the associated sample feature; and obtaining the target sample feature map corresponding to the initial sample feature map according to the target sample feature.

16. The non-transitory computer readable medium of claim 15, wherein the set of instructions that is executable by one or more processors of an apparatus to cause the apparatus to further perform:

obtaining a sample image comprising a sample object, and determining a sample object segmentation map and a sample object label of the sample object in the sample image; inputting the sample image to a convolutional layer of the encoder, to obtain an initial sample feature map of the sample image;

inputting the initial sample feature map to the self-attention mechanism layer of the encoder;

obtaining a target sample feature map corresponding to the initial sample feature map according to position information of each initial sample feature in the initial sample feature map and a position relationship between the each initial sample feature and other initial sample features;

inputting the target sample feature map to the decoder for processing, to obtain a predicted object segmentation map and a predicted object label of the sample object in the sample image; and training the image processing model according to a loss function composed of the sample object segmentation map and the sample object label, and the predicted object segmentation map and the predicted object label.

17. The non-transitory computer readable medium of claim 15, wherein the target object is an esophagus, the to-be-processed image is a computed tomography (CT) image, and the object label is a pathological label.

* * * * *